(12) United States Patent
Gao et al.

(10) Patent No.: US 7,520,048 B2
(45) Date of Patent: Apr. 21, 2009

(54) METHOD OF FABRICATING A GMR HEAD (75) Inventors: Yunxiao Gao, Sunnyvale, CA (US);
Aron Pentek, San Jose, CA (US); Alan J. Tam, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/809,184

(22) Filed: May 31, 2007

(65) Prior Publication Data
US 2007/0242393 A1 Oct. 18, 2007

Related U.S. Application Data

(62) Division of application No. 10/857,036, filed on May 28, 2004, now abandoned.

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/121; 360/122; 360/317; 360/324; 360/325; 451/5; 451/41

(58) Field of Classification Search . 29/603.13–603.16, 29/603.18; 360/121, 122, 317, 324–327; 216/62, 65, 66; 451/5, 41
See application file for complete search history.

(56) References Cited

U.S. PATENT DOCUMENTS

| | | | |
|---|---|---|---|
| 4,130,847 A | 12/1978 | Head et al. | 360/122 |
| 5,331,497 A | 7/1994 | Fuchigami | 360/126 |
| 5,634,259 A | 6/1997 | Sone et al. | 29/603.12 |

(Continued)

FOREIGN PATENT DOCUMENTS

EP 627732 12/1994

(Continued)

OTHER PUBLICATIONS

U.S. Appl. No. 10/857,063, filed May 28, 2004.

(Continued)

*Primary Examiner*—Paul D Kim
(74) *Attorney, Agent, or Firm*—Silicon Valley Patent Group LLP; Omkar Suradevara (57) ABSTRACT

A giant magnetoresistive (GMR) head is formed to include a recess in an overcoat layer that reduces stress on the poles. The process includes depositing a seed layer over the overcoat layer prior to plating a metal mask layer with an opening where the recess is to be formed, wet chemical etching the seed layer through the opening in the mask layer and performing an ion milling process to remove any remaining traces of the seed layer. With the seed layer completely removed, a trench having smooth sidewalls and bottom is etched in the overcast layer by a reactive ion etch (RIE) process. The saw that is used to separate the head elements in the wafer can be passed through the clean trench without contacting the overcoat layer, thereby avoiding the chipping and cracking that might otherwise result from the use of a silicon dioxide or silicon nitride overcoat layer.

28 Claims, 10 Drawing Sheets

U.S. PATENT DOCUMENTS

| | | | |
|---|---|---|---|
| 5,805,380 A | 9/1998 | Ishihara et al. | 360/235.2 |
| 5,872,684 A | 2/1999 | Hadfield et al. | 360/103 |
| 5,985,163 A | 11/1999 | Cha et al. | 216/22 |
| 6,131,271 A * | 10/2000 | Fontana et al. | 29/603.14 |
| 6,278,580 B1 | 8/2001 | Sasaki | 360/126 |
| 6,282,061 B1 | 8/2001 | Kanda et al. | 360/236.5 |
| 6,324,747 B1 | 12/2001 | Boutaghou et al. | 29/603.12 |
| 6,421,205 B1 | 7/2002 | Dorius et al. | 360/236.3 |
| 6,493,185 B1 | 12/2002 | Dorius et al. | 360/235.7 |
| 6,524,491 B1 * | 2/2003 | Liu et al. | 216/22 |
| 6,578,252 B2 * | 6/2003 | Sasaki | 29/603.12 |
| 6,654,205 B1 | 11/2003 | O'Hara et al. | 360/236.3 |
| 6,696,226 B1 | 2/2004 | Dinan et al. | |
| 6,920,016 B2 | 7/2005 | Yamakura et al. | 360/235.7 |
| 7,031,122 B2 | 4/2006 | Pust et al. | 360/319 |
| 7,064,925 B2 | 6/2006 | Maruyama et al. | |
| 7,110,219 B2 | 9/2006 | Ota | |
| 2003/0227716 A1 | 12/2003 | Yamakura et al. | 360/234.7 |
| 2004/0174632 A1 * | 9/2004 | Sasaki et al. | 360/122 |
| 2005/0237666 A1 | 10/2005 | Hsiao et al. | 360/126 |

FOREIGN PATENT DOCUMENTS

| | | |
|---|---|---|
| JP | 59-63057 | 4/1984 |
| JP | 4339308 | 11/1992 |
| JP | 8171708 | 7/1996 |

OTHER PUBLICATIONS

Office Action dated Feb. 6, 2007 in U.S. Appl. No. 10/857,036.
Office Action dated Oct. 31, 2006 in U.S. Appl. No. 10/857,036.
Response to Office Action dated Dec. 28, 2006 in U.S. Appl. No. 10/857,036.
U.S. Appl. No. 10/831,834, filed Apr. 26, 2004.
Examiner Interview Summary Record dated Dec. 21, 2006 in U.S. Appl. No. 10/831,834.
Office Action dated Dec. 21, 2006 in U.S. Appl. No. 10/831,834.
Office Action dated Oct. 5, 2006 in U.S. Appl. No. 10/831,834.
Amendment A Under 37 C.F.R. § 1.111 dated Jan. 4, 2007 in U.S. Appl. No. 10/831,834.
Supplemental Response B Under 37 C.F.R. § 1.111 dated Jan. 5, 2007 in U.S. Appl. No. 10/831,834.
Applicant Arguments/Remarks resubmitted on Jan. 5, 2007 in U.S. Appl. No. 10/831,834.
Examiner Interview Summary dated Jan. 11, 2007 in U.S. Appl. No. 10/831,834.
Notice of Allowance dated Jan. 11, 2007 in U.S. Appl. No. 10/831,834.

* cited by examiner

METHOD OF FABRICATING A GMR HEAD

This application is a divisional of application Ser. No. 10/857,036, filed May 28, 2004, abandoned, which is incorporated herein by reference in its entirety.

FIELD OF THE INVENTION

This invention relates to giant magnetoresistive (GMR) heads for recording and reading magnetic transitions on a moving magnetic medium. In particular, this invention relates to the problems created by the thermal expansion of the layers in such GMR heads.

BACKGROUND

In the operation of a typical GMR head device, a moving magnetic storage medium, typically a disk, is placed near the pole-tips of the GMR head. During the read operation, the changing magnetic flux from magnetized regions in the moving storage disk induces a changing magnetic flux in the pole-tips and the gap between them. The magnetic flux is carried through the pole-tips and yoke-shaped core and around spiral conductor coil winding turns located between the yoke arms. The changing magnetic flux induces an electrical voltage across the conductor coil. The electrical voltage is representative of the magnetic pattern stored on the moving magnetic storage disk. During the write operation, an electrical current is caused to flow through the conductor coil. The current in the coil induces a magnetic field across the gap between the pole-tips. A fringe field extends into the nearby moving magnetic storage disk, inducing (or writing) a magnetic domain in the magnetic storage disk. Impressing current pulses of alternating polarity across the coil causes the writing of magnetic domains of alternating polarity in the storage disk.

The GMR head is normally attached to a substrate, the head and substrate together forming a slider. The substrate includes aerodynamic surfaces that cause the slider to "fly" over the moving disk.

As the recording density of the magnetic domains in the magnetic disks increases, the "flying height" of the GMR heads has become lower. The reduced flying height is necessary to enable the head to read the data bits stored on the disk effectively and without interference or crosstalk from adjacent data bits.

The lessening in the flying height has created a number of problems in the fabrication of the GMR heads. One of these problems relates to the thermal properties of the layers that together make up the head. In particular, the head tends to heat up by friction with the supporting layer of air as the head "flies" over the disk, and the constituent layers expand as this happens. This expansion increases the risk that the head will contact or "crash into" the disk, thereby damaging the head, the disk, or both, and that stresses will be created between the layers in the head.

Typically, the top layer in the head is a relatively thick "overcoat layer" that is formed of alumina ($Al_2O_3$). One problem with alumina is that its coefficient of thermal expansion (CTE) of 6 $\mu m/m/^\circ$ C. is relatively high, which creates a temperature-induced protrusion at the air-bearing surface (ABS) when the head heats up. Other materials with lower CTEs might be desirable as substitutes for alumina in the overcoat layer, but in many cases these other materials present manufacturability problems.

U.S. Pat. No. 5,643,259 to Sone et al. describes the formation of a recess in the overcoat layer at the trailing edge of the slider, which, it claims, prevents the temperature-induced protrusion from extending "above a predetermined level of the surface facing the disk" (col. 2, lines 50-51). Alumina is used for the overcoat layer, however, so Sone et al. are limited to the relatively high CTE of alumina. Published European Patent Application No. 0627732 A1 teaches an overcoat layer made of silicon dioxide or silicon nitride, both of which have a CTE less than alumina, but it fails to teach a technique for overcoming the fabrication problems presented by the use of these materials, namely, that they tend to chip or crack when the GMR head elements in a wafer are separated from each another by sawing.

Accordingly, what is needed is a material for use in the overcoat layer that has a CTE lower than alumina and yet can readily accommodate to the fabrication process.

SUMMARY

In accordance with an embodiment of this invention, silicon dioxide ($SiO_2$) or silicon nitride ($Si_3N_4$) is used as an overcoat layer in a giant magnetoresistive (GMR) head, and a recess is formed in the silicon dioxide or silicon nitride overcoat layer to prevent the overcoat layer from chipping during the separation (sawing) of the wafer into individual heads and to relieve stress on the other layers of the head during operation. The recess is formed by a process that includes: depositing (e.g., plating) a seed layer on the surface of the overcoat layer, depositing a mask layer over the seed layer, the mask layer having an opening where the recess is to be located thereby exposing a section of the seed layer, wet-etching the exposed section of the seed layer through the opening in the mask layer, removing any remaining portions of the exposed section of the seed layer by a reactive ion etch (ion milling), and etching the recess in the overcoat layer through the opening in the mask layer by reactive ion etching. By this process, essentially all of the exposed section of the seed layer is removed, and this yields a recess having a smooth floor and sidewall.

Typically, a plurality of heads are formed on a single wafer, and the process described above is used to form a rectilinear lattice of trenches that separate the individual heads. In the finished heads, the recess is located on one side of each head. Therefore, the dicing saw that is used to separate the heads cuts a path that abuts three sides of each head and is separated from the fourth side of each head by a distance that is substantially equal to the width of the recess. After the heads have been diced, the section of the wafer than remains attached to the head becomes the substrate, and the head and substrate together form the slider.

DETAILED DESCRIPTION

Figure 1:
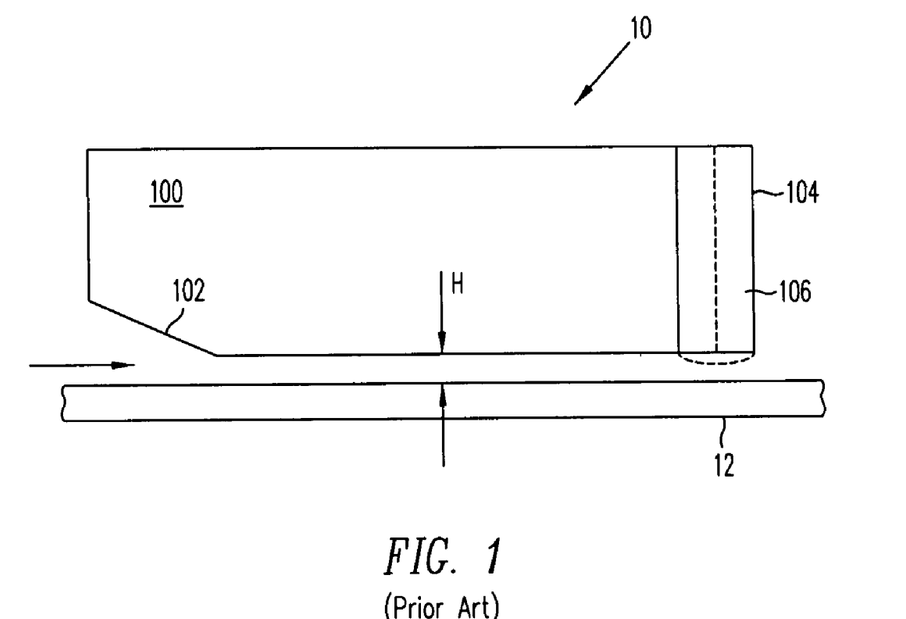
FIG. 1 is a side view of a conventional slider containing a GMR head.

FIG. 1 shows a side view of a slider 10 and a magnetic storage disk 12. Slider 10 includes a substrate 100, which has a leading edge 102, and a giant magnetoresistive (GMR) head 104. As disk 12 moves in the direction indicated by the arrow, air strikes the leading edge 102 and causes slider 10 to "float" at a flying height H above disk 12.

As indicated above and as described further below, GMR head 104 includes a number of layers of insulating and magnetic materials. One of the thickest layers is the overcoat layer, indicated at 106. As the air passes beneath assembly 10, friction between the moving air and assembly 10 causes assembly 10 to heat up, for example, to a temperature of 50° to 75° C. This in turn causes the layers in GMR head 104 to expand and can create a temperature-induced protrusion, represented by the dashed line in FIG. 1. If the temperature-induced protrusion becomes too large, contact may occur between GMR head 104 and disk 12. Such contact, usually referred to a "crash," can damage GMR head 104, disk 12, or both.

Overcoat layer 106 is customarily made of alumina. Alumina has a relatively high coefficient of thermal expansion (CTE) of 6 µm/m/° C. It would be preferable to use a material such as silicon dioxide, which has a CTE of 2 µm/m/° C., or silicon nitride, which has a CTE of 3 µm/m/° C. A 30-50% reduction in the size of the temperature-induced protrusion can be achieved by forming the overcoat layer of silicon dioxide or silicon nitride.

Figure 2:
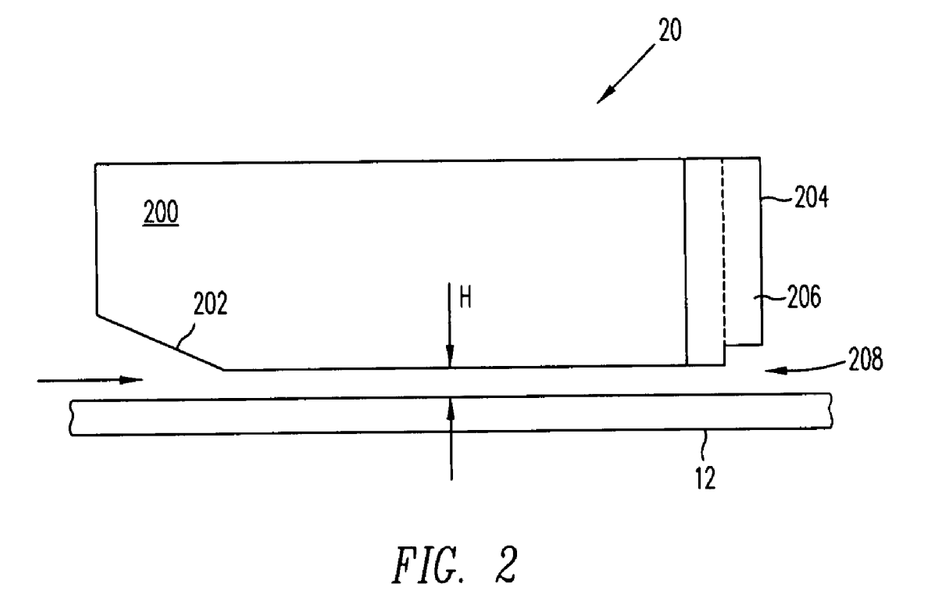
FIG. 2 is a side view of a slider containing a GMR head with a silicon dioxide or silicon nitride overcoat layer and a recessed overcoat layer.

FIG. 2 shows a similar cross-sectional view of a slider 20, which contains a GMR head 204 in accordance with the invention. An overcoat layer 206 in GMR head 204 is made of silicon dioxide or silicon nitride, and a recess 208 has been formed in overcoat layer 206 at the trailing edge of slider 20.

Figure 3:
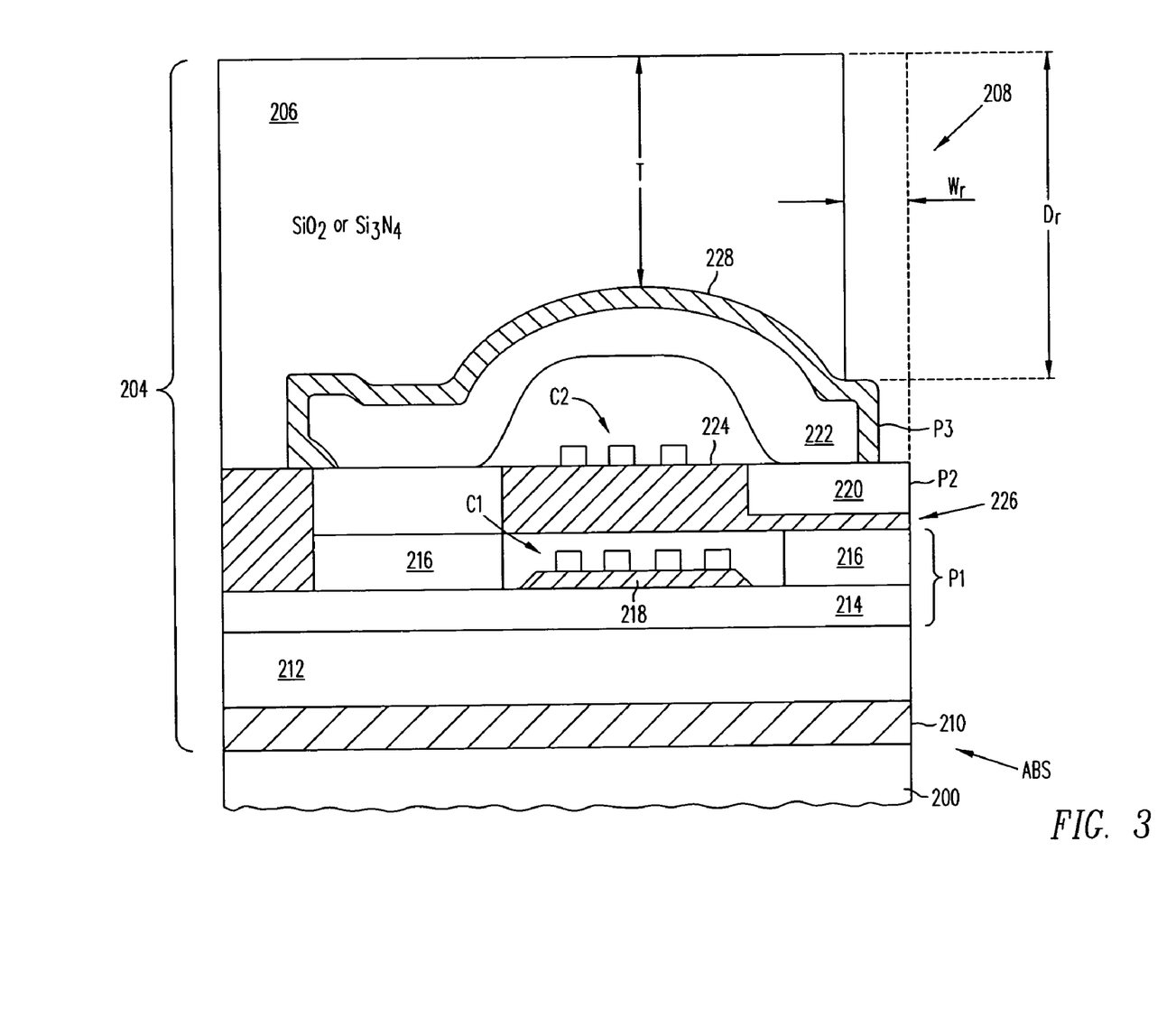
FIG. 3 is a detailed cross-sectional view of a GMR head in accordance with the invention.

FIG. 3 is a detailed cross-sectional view of GMR head 204, showing its constituent layers. A portion of substrate 200 is also shown. Note that, in FIG. 3, GMR head 204 has been rotated 90° as compared with FIG. 2, so that recess 208 is at the upper right hand corner and substrate 200 is located under GMR head 204.

The structure of GMR head 204 will now be described. Starting at the bottom, in direct contact with substrate 200 is an undercoat layer 210, which is typically made of alumina. Layer 212 is an optional layer that may contain magneto-resistive (MR) head. In some embodiments, layer 212 is omitted. Above layer 212 are two layers 214 and 216 of a magnetic material such as NiFe that together form the bottom pole P1 of GMR head 204. A plurality of coil windings C1 are formed in an opening in layer 216, separated from layer 214 by an insulating layer 218. Layers 220 and 222 are magnetic layers of a magnetic material such as NiFe that together form a top pole P2. Layer 222, normally referred to as the yoke, is curved, and a plurality of coil windings C2 are formed in the space created by the curve in layer 222. Poles P1 and P2 are separated by an insulating layer 224 which forms a gap 226 at the air-bearing surface ABS. To write data, a current is applied through terminals (not shown) that connect to coil windings C1 and C2. This current induces a magnetic field across the gap 226, which writes data onto a magnetic data storage disk.

An alumina layer 228 covers magnetic layer 222, and overcoat layer 206 is formed over alumina layer 228. Alumina layer 228 may be 1-5 µm thick, for example. Overcoat layer 206 may be about 20 µm thick as measured from the top of alumina layer 228 (T) and about 30 µm thick as measured from the gap 226. As noted above, overcoat layer 206 is made of silicon dioxide or silicon nitride to take advantage of the lower CTE of these materials as compared with alumina. Recess 208, having a width $W_r$ and a depth $D_r$, is shown at the upper right hand corner of the figure. $W_r$ may be equal to 3 µm±2 µm, for example.

Methods of fabricating poles P1 and P2, coil windings C1 and C2 and the intervening insulating layers are well known in the art and will not be described here.

It is important that recess 208 be perfectly vertical and have smooth side walls and bottom, free of any spikes or projections of silicon dioxide or silicon nitride. Otherwise, during the dicing process (described below), these brittle spikes or projections will tend to break off and fragment, causing crack/chip defects and reducing product yield. Furthermore, the brittle spikes may break of inside the disk drive, causing it to fail.

As noted above, typically a plurality of GMR heads are fabricated simultaneously on a wafer, and then the wafer is diced (sawed) to separate the heads from each other. FIGS. 4A-4H illustrate a cross-sectional view of two GMR heads 260 and 262 in a wafer 250. For the sake of clarity, the details of GMR heads 260 and 262 have been omitted. Only the contour of the yoke is shown. FIGS. 4A-4H will be used to explain the process of forming recesses 208.

Figure 4A:
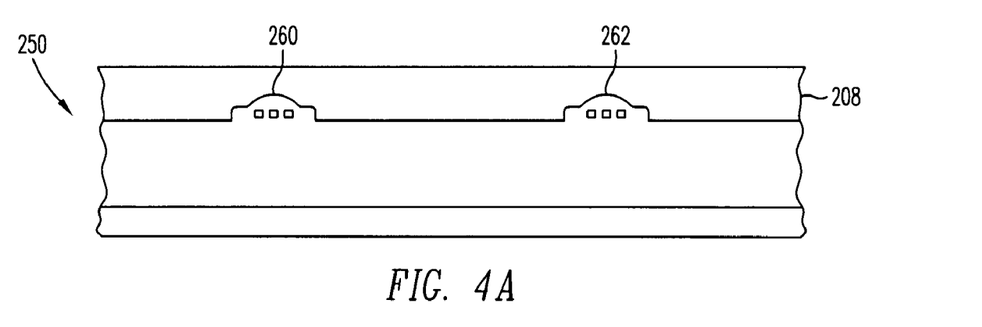
FIGS. 4A-4H illustrate a process for fabricating a GMR head according to the invention.

As shown in FIG. 4A, the process starts with overcoat layer 208 having been deposited over the top surface of the wafer 250. The thickness of overcoat layer 208 may vary from 15 µm to 45 µm, for example. Overcoat layer 208 is made of silicon dioxide or silicon nitride and may be deposited by a conventional physical vapor deposition (PVD) or plasma-enhanced chemical vapor deposition (PECVD) process. After overcoat layer 208 has been deposited, its top surface may be lapped or chemical-mechanical polished to planarize it, remove any irregularities and expose the copper connections.

Figure 4B:
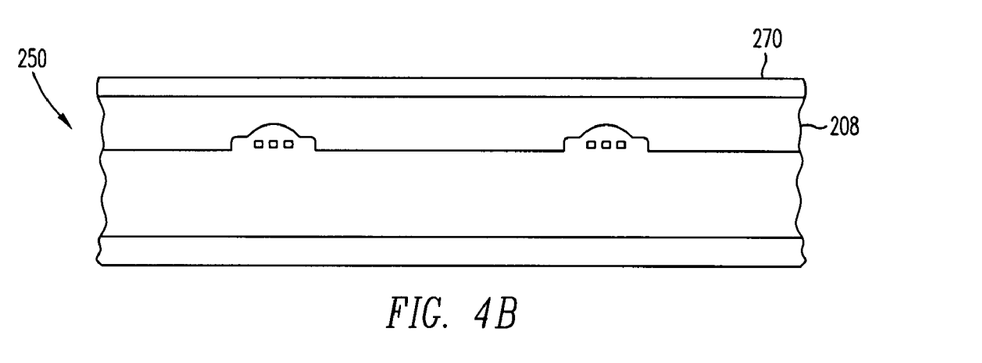

Next, as shown in FIG. 4B, a seed layer 270 is deposited on the surface of overcoat layer 208 to form a base for the metal mask layer that will be deposited later (see below). Seed layer 270 is typically deposited by evaporation or PVD and may be 800 Å thick in one embodiment. The composition of seed layer 270 depends on the composition of the metal mask layer that will later be deposited. Table 1 shows the composition of seed layer 270 for several types of metal mask layer.

TABLE 1

| Metal Mask Layer | Seed Layer |
| --- | --- |
| NiFe | Ta/Cu/NiFe, CoFe, CoFeN, NiCr |
| CoFe | NiCr |
| CoNiFe | NiCr |
| Cu | AuCr, Cu, NiFe/Cu |

It should be understood that the seed layer materials listed in Table 1 are illustrative only and not limiting. Other conductive metals can be used as the seed layer.

Figure 4C:
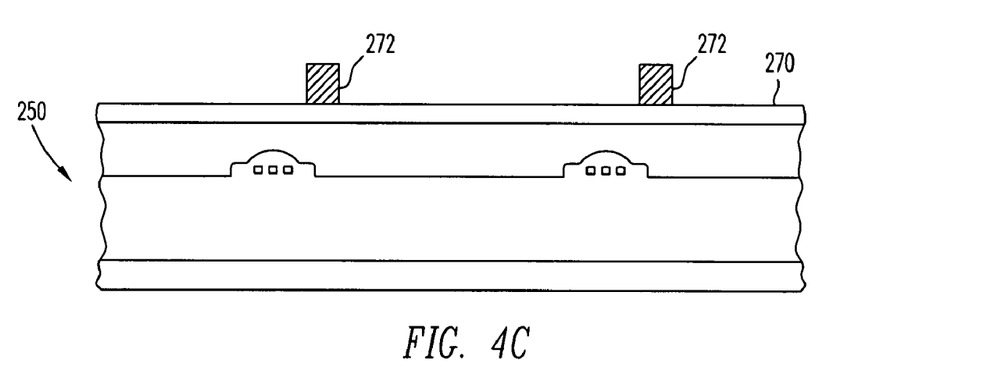

After seed layer 270 has been deposited, a photoresist layer 272 is formed on seed layer 270 and patterned as shown in FIG. 4C. The sections of photoresist layer 272 that remain after patterning cover the areas where recesses 208 are to be formed. As shown in FIG. 3, recesses 208 include the plane defined by the ABS and extend back a distance $W_r$ from the ABS.

Figure 4D:
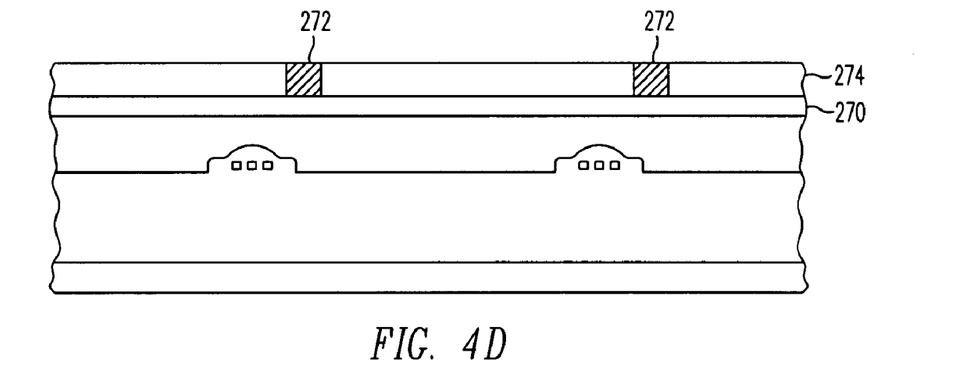

As shown in FIG. 4D, a metal mask layer 274 is deposited in the areas not covered by photoresist layer 272. Metal mask layer 274 may be deposited by plating or physical vapor deposition (sputtering) and may be 1-2 μm thick, for example. Metal mask layer 274 may consist of any of the materials listed in Table 1. After metal mask layer 274 has been deposited, the remaining portions of photoresist layer 272 are removed, yielding the structure shown in FIG. 4E, with openings 276 formed in metal mask layer 274 where recesses 208 will be located.

Figure 4E:
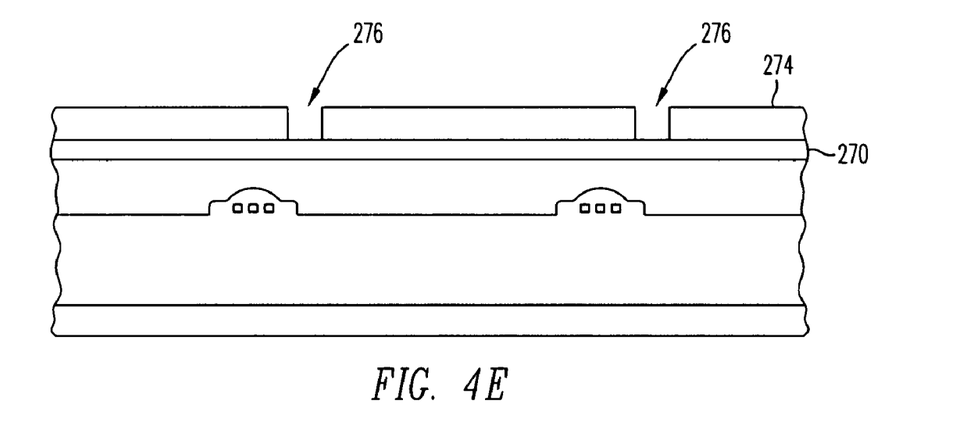

As FIG. 4E indicates, the formation of openings 276 in metal mask layer 274 exposes areas of seed layer 270 which must be removed before overcoat layer 206 can be etched. It is highly important that all of the areas of seed layer 270 that lie beneath openings 276 be removed while doing minimal damage to the vertical surfaces of metal mask layer 274 that surround openings 276. Known processes of removing seed layer 270, which use a wet-chemical etch, leave traces of seed layer 270 in the openings 276. These traces act as "micromasks" during the etching of overcoat layer 206, creating a jagged surface which is replicated as the etching of overcoat layer 206 continues down to the etch-stop layer (e.g. alumina layer 228 in FIG. 3). The resulting spikes and other irregularities in overcoat layer 206 can break off or fracture during the dicing of wafer 250.

To insure that all of the seed layer 270 that is exposed by openings 276 is removed, a combination wet/dry etch process is used. First, seed layer 270 is exposed to a wet chemical etch. The chemicals and temperature of the etch process depend on the composition of seed layer 270 and are shown in Table 2.

TABLE 2

| Seed Layer | Etchants | Temperature |
| --- | --- | --- |
| CoFe or CoFeN | 30-50% HCl and Ferrous Sulfate | 20-35° C. |
| NiFe | $H_2SO_4$ and Ferric Ammonium Sulfate | 20-35° C. |
| Cu | 25-45% $NaH_4OH$ and Ammonium Persulfate | 15-35° C. |

The HCl/ferrous sulfate etchant will etch a CoFe/CoFeN seed layer without etching plated NiFe, even after etching over 6 minutes. A typical etch for a 1500 Å seed layer may last 1 to 3 minutes.

The $H_2SO_4$/ferric ammonium sulfate etchant will attack the NiFe seed as well as plated NiFe. It will attack Cu at a different rate. Therefore, Cu should be used as the metal mask layer. Typically, 30 seconds to 1 minute is required to etch a 1500 Å seed layer.

The $NaH_4OH$/ammonium persulfate etchant will also attack NiFe, but at a different rate than Cu. Typically, 15 to 45 seconds are required to etch a 1500 Å Cu seed layer.

The wet-chemical etch is followed by a low-rate ion milling process, which cleans the interface between seed layer 270 and overcoat layer 206. The angle of the ion beam with respect to the normal of the surface of overcoat layer 206 is set from −10° to −70°. The ion milling process can be performed for 5 to 10 minutes.

Figure 4F:
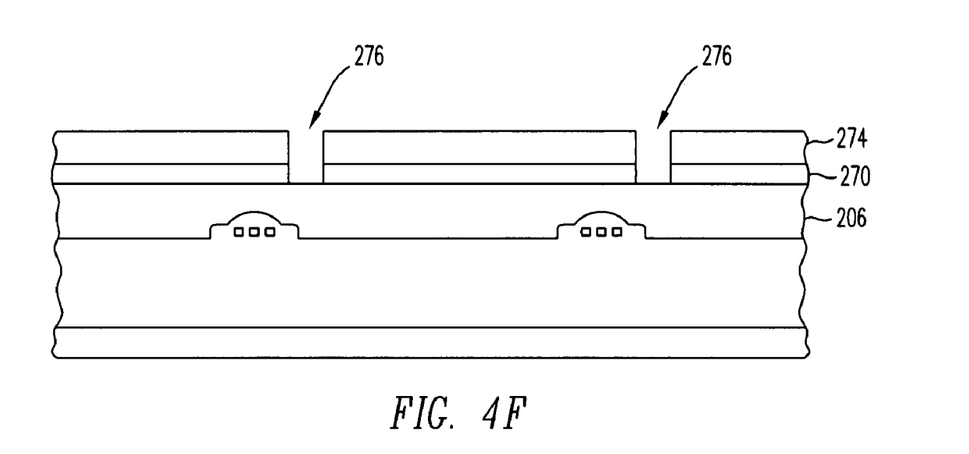

With all traces of seed layer 270 removed from the surface of overcoat layer 206, the etching of overcoat layer 206 though openings 276 in metal mask layer 274 can begin. Overcoat layer 206 is etched using a reactive ion etch (RIE) process. A Unaxis etcher may be used. The RIE may be $CF_4$ based, with the RF power at 100-300 W. Under these process conditions, the silicon dioxide or silicon nitride etches at a rate of 4000 Å/min. If overcoat layer 206 is formed of silicon nitride, 20-100 sccm of $CHF_3$ are added to the RIE.

A $CF_4$-based RIE process provides a vertical 90-degree profile. The unique wet/dry seed layer removal ensures a smooth sidewall. The wet chemical etch removes the seed layer with minimal damage to the mask layer, while the subsequent low rate ion milling process removes any remaining trace of the seed layer. The resulting sidewall of the $SiO_2$ or $Si_3N_4$ overcoat layer is much smoother than can be obtained using a conventional seed layer removal process.

Figure 4G:
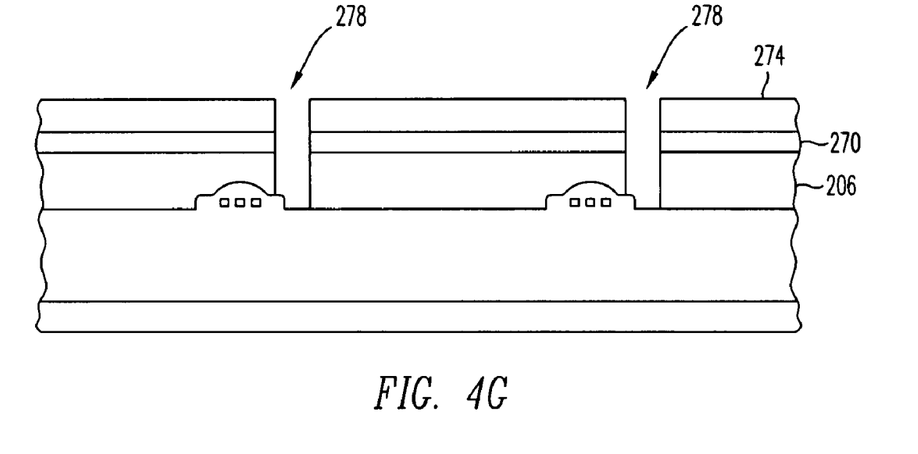
Figure 4H:
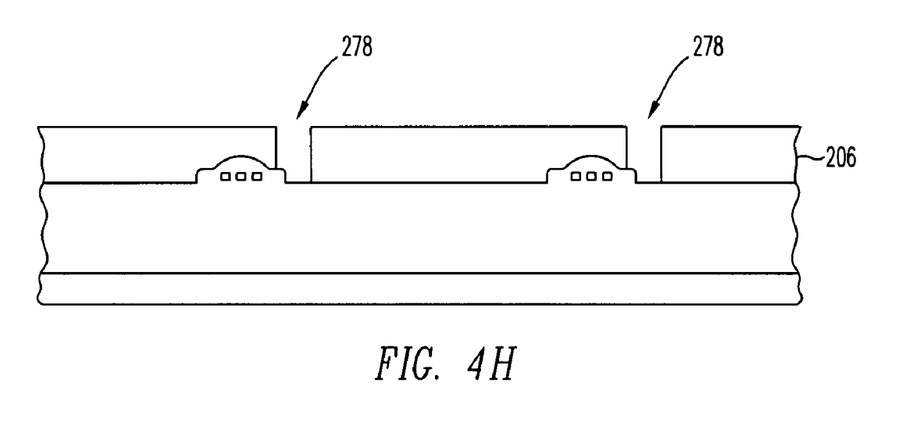

At the completion of the RIE process, trenches 278 have been formed in overcoat layer 206, as shown in FIG. 4G. Trenches 278 could be 30-120 μm wide and 5-45 μm deep, for example. Metal mask layer 274 and seed layer 270 are then removed, leaving the structure shown in FIG. 4H.

Figure 5A:
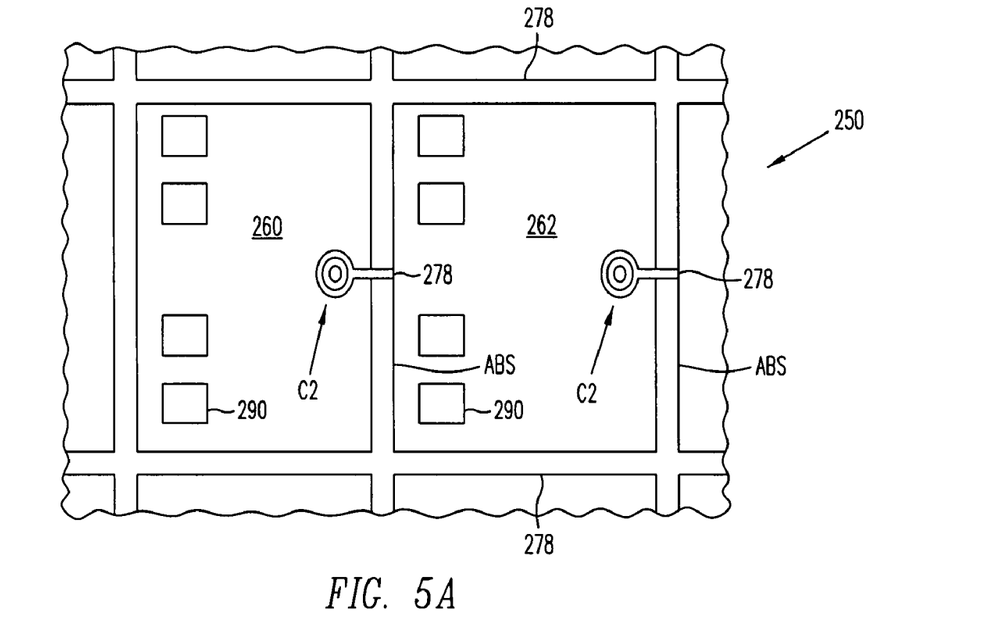
FIGS. 5A and 5B are top views of a portion of a wafer containing GMR heads prior to dicing.
Figure 5B:
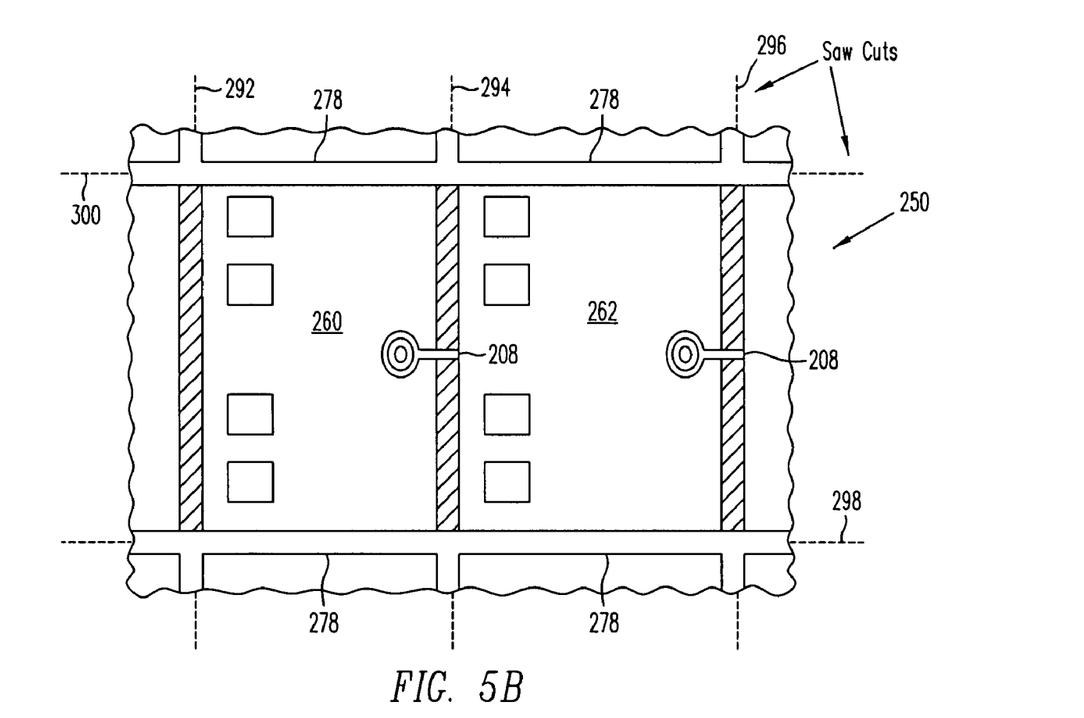

FIG. 5A is a top view of wafer 250, showing the rectilinear lattice of trenches 278 surrounding GMR heads 260 and 262. The upper coil C2 and ABS of each head are shown, as well as terminals 290, which are connected to coils C1 and C2 via connectors (not shown). The dashed lines in FIG. 5B show the paths 292, 294, 296 of the dicing saw blade that is used to separate the heads in wafer 250 on the sides adjacent the air bearing surfaces (ABS). Saw paths 298, 300 separate the heads on the sides perpendicular to the ABS. After the heads are separated by sawing, the edges are lapped as necessary to provide the desired width of recesses 208 (the dimension $W_r$ in FIG. 3).

Figure 6A:
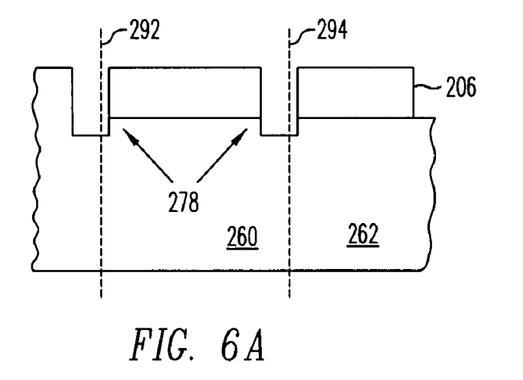
FIG. 6A is a cross-sectional view of a portion of the wafer before the GMR heads are separated.

FIG. 6 is a cross-sectional view of saw paths 292 and 298, showing how they run along the sides of head 260.

Figure 6B:
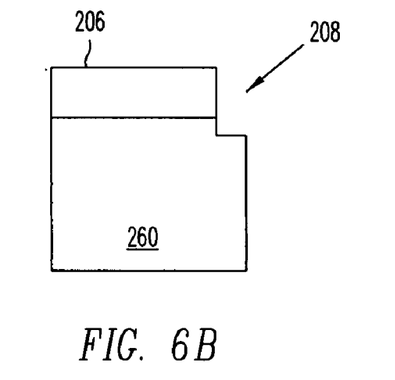
FIG. 6B is a cross-sectional view of a single GMR head after it has been separated from other heads in the wafer.

Thus, because of the formation of trenches 278, the dicing saw does not need to cut into overcoat layer 206 which, being made of silicon dioxide and silicon nitride, is prone to chipping and cracking. Moreover, as described above, certain of the trenches 278 are used to form recesses 208. FIG. 6B shows head 260 after it has been separated from the surrounding heads, with trench 278 forming recess 208.

Figure 7:
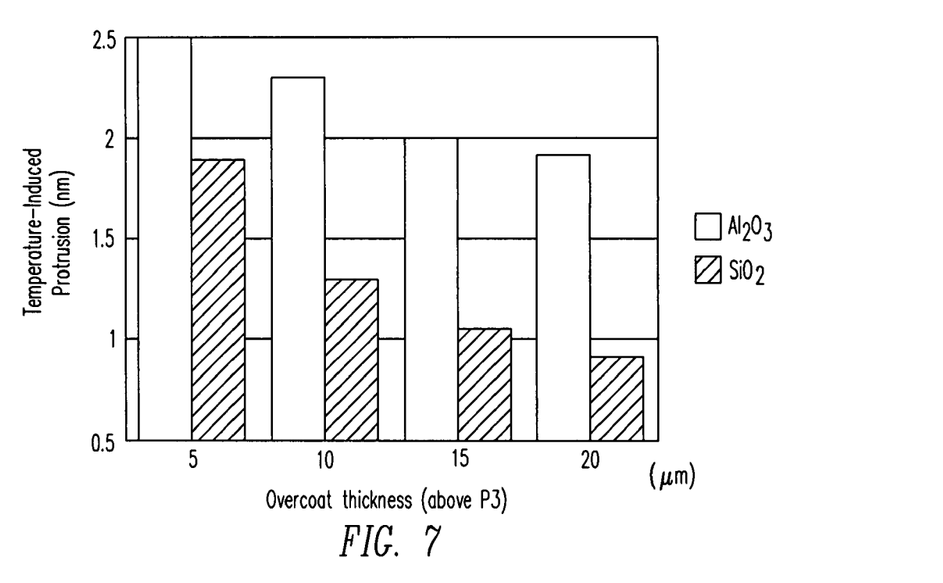
FIG. 7 is a graph showing a comparison of the temperature-induced protrusion generated by alumina and silicon dioxide overcoat layers, respectively, as a function of the thickness of the overcoat layer.

As indicated above, the use of a silicon dioxide or silicon nitride overcoat layer reduces the temperature-induced protrusion of the overcoat layer, as compared with an overcoat layer made of alumina. FIG. 7 is a graph showing the temperature-induced protrusion of silicon dioxide and alumina layers as a function of the thickness of the overcoat layer. It indicates that the advantages of using silicon dioxide increase as the thickness of the overcoat layer increases. For example, at a thickness of 20 μm the temperature-induced protrusion of a silicon dioxide overcoat layer is less than 1.0 nm for silicon dioxide versus almost 2.0 nm for alumina.

Figure 8:
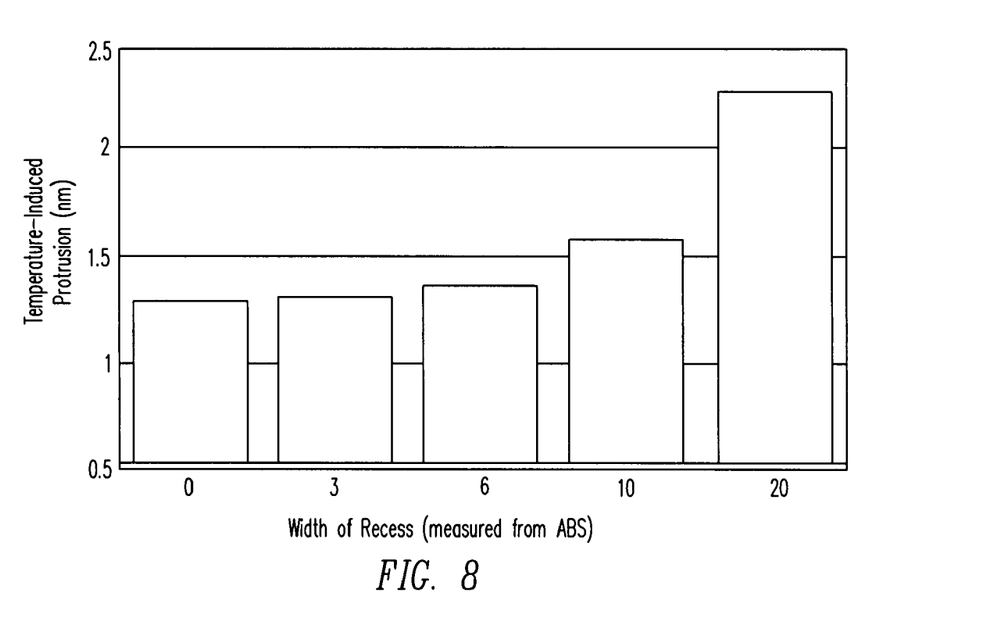
FIG. 8 is a graph showing the size of the temperature-induced protrusion generated by a silicon dioxide overcoat layer as a function of the width of the recess.

FIG. 8 is a graph showing the temperature-induced protrusion of a silicon dioxide overcoat layer as a function of the width of the recess (measured from the ABS). As indicated, the temperature-induced protrusion increases as the width of the recess increases. It has been found that a recess having a width of 3±2 µm is desirable to maintain a relatively low and stable pole-top recess (PTR).

Figure 9:
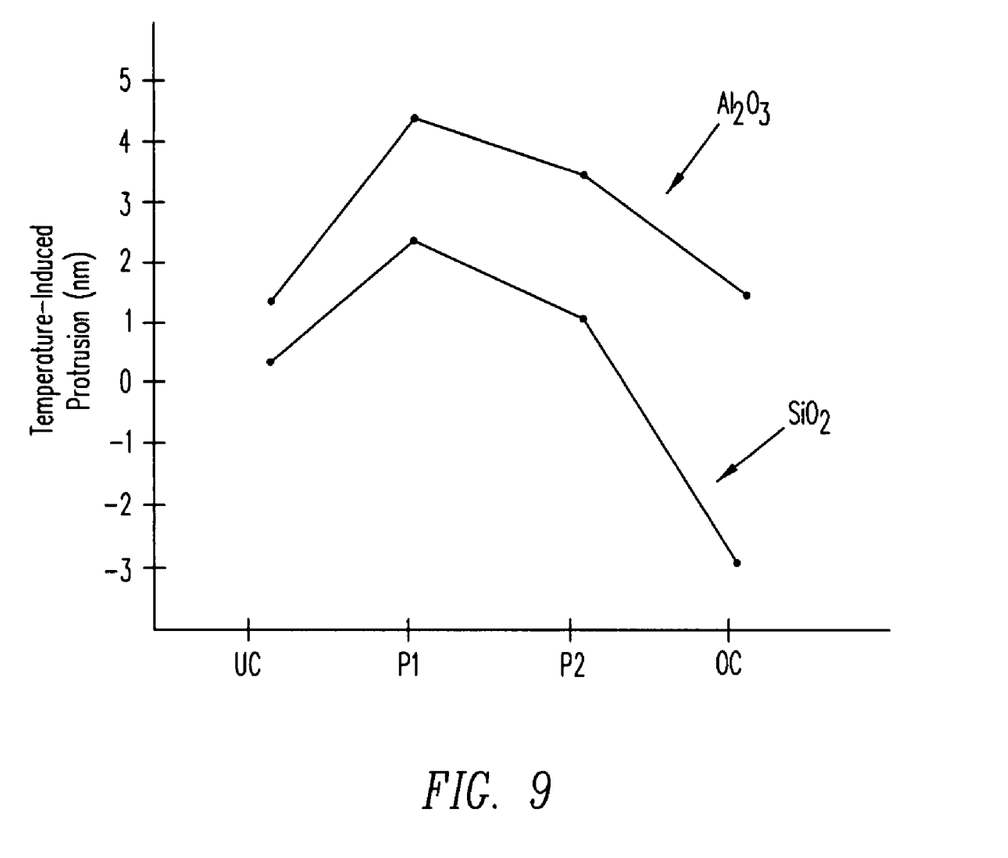
FIG. 9 is a graph showing the relative change in the temperature-induced protrusion of various layers in GMR heads containing an alumina and a silicon dioxide overcoat layer, respectively, as the temperature increases from 25° C. to 75° C.

FIG. 9 is a graph showing the relative change in the temperature-induced protrusion of four of the layers in a GMR head as the temperature increases from 25° C. to 75° C. The four layers are the undercoat layer (UC), the pole layers P1 and P2, and the silicon dioxide overcoat layer (OC). Note that the PTR of the silicon dioxide overcoat layer has been reduced about 3 nm as the temperature increases from 25° C. to 75° C.

This invention allows GMR head designers to obtain the reduced temperature-induced protrusion of a silicon dioxide or silicon nitride layer without sacrificing the advantages of having a recess in the overcoat layer. The formation of a recess reduces the stress to which the upper pole-tip P2/P3 is exposed. The overcoat layer is generally deposited under a compressive stress. Therefore, with no recess the pole-tip P2/P3 experiences a tensile stress. Computer modeling studies indicate that the pole-tip sees a stress that is equal to approximately one-half of the stress in the overcoat layer.

When a recess is formed in the overcoat layer, the pole-tips experience a compressive stress that is equal to about one-half of the stress in the overcoat layer. Thus the net change in the stress experienced by the pole-tips from the addition of the recess is approximately equal to the stress in the overcoat layer.

Figure 10:
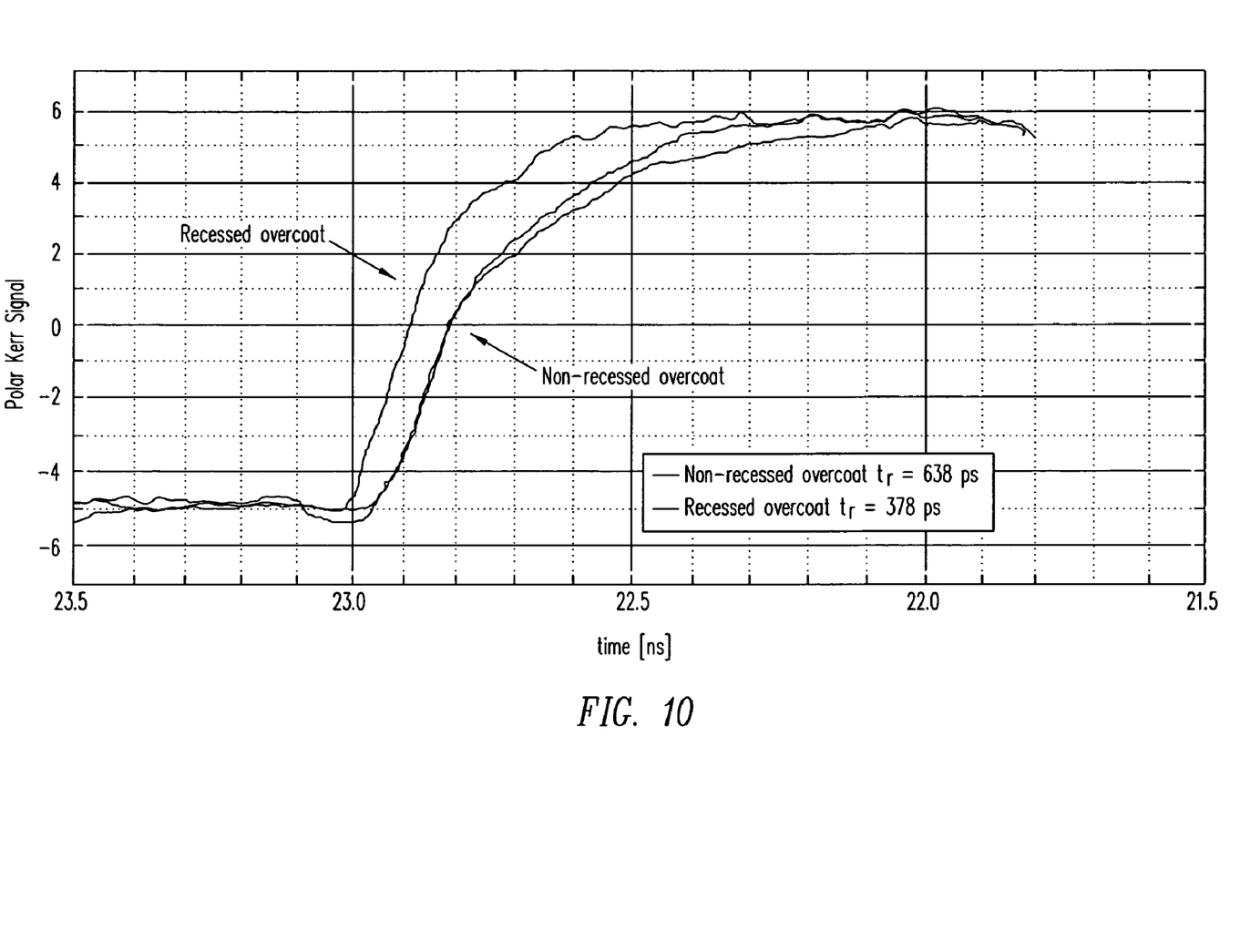
FIG. 10 is a graph showing the rise time of the magnetic flux in a head containing a recessed overcoat as compared with the rise time of the magnetic flux in a head containing a non-recessed overcoat.
Figure 11:
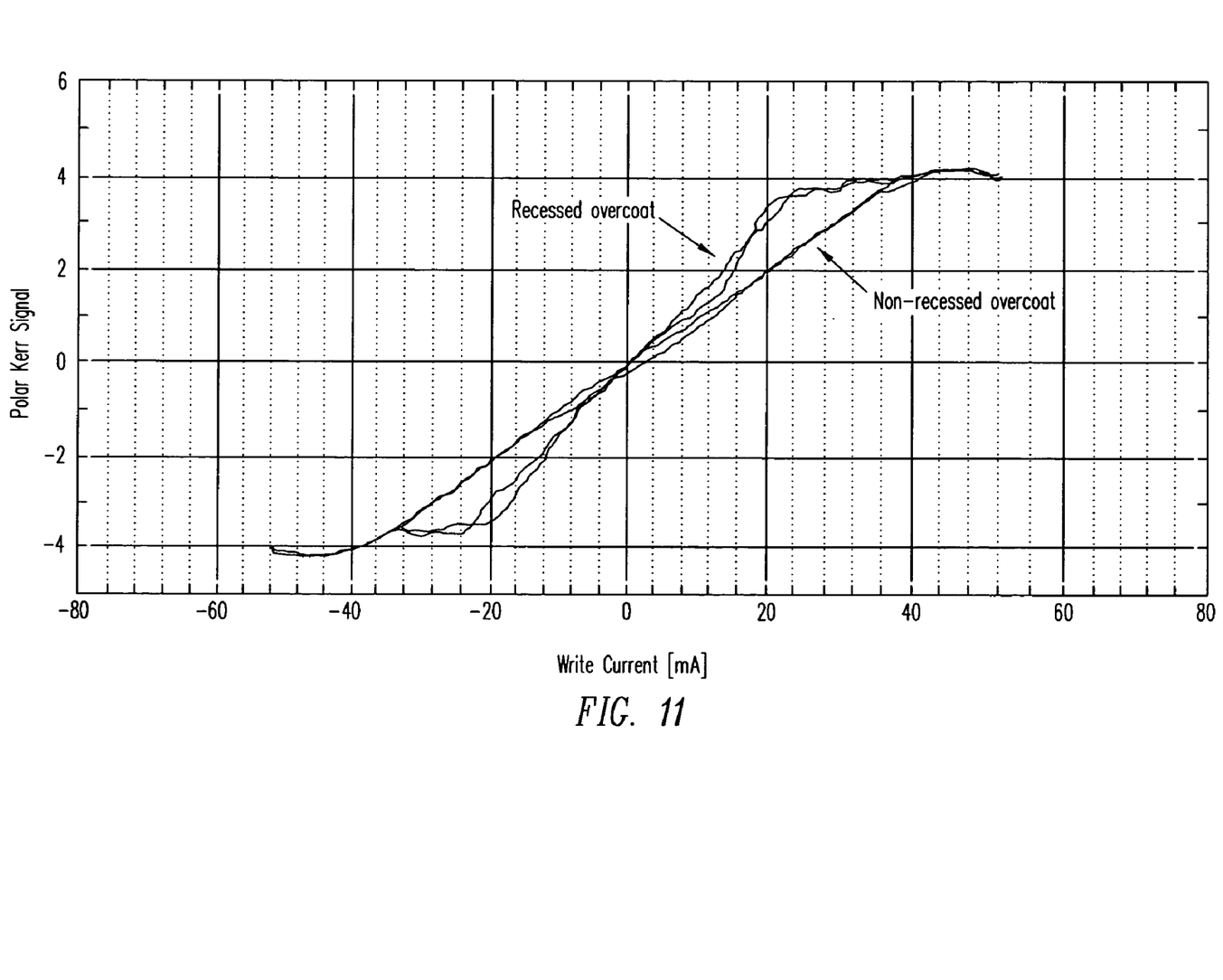
FIG. 11 is a graph showing the write current required to saturate a head containing a recessed overcoat as compared with the write current required to saturate a head containing a non-recessed overcoat.

As shown in FIGS. 10 and 11, this change significantly improves the magnetic performance of the head. FIG. 10 shows that the magnetic flux rise time ($t_r$) of a head having a recessed overcoat is significantly less than the rise time of a non-recessed overcoat head. FIG. 11 indicates that the write current required to saturate a recessed overcoat head is significantly less than the write current required to saturate a non-recessed overcoat head In summary, this invention permits the use of silicon dioxide or silicon nitride as an overcoat layer in a GMR head, with the consequent reduction in CTE and temperature-induced protrusion, without creating any fabrication problems and without sacrificing the electromagnetic performance of the head.

What is claimed is:

1. A method of fabricating a GMR head comprising:
providing a wafer element comprising a plurality of GMR head elements, each of said GMR head elements comprising a pair of magnetic pole-tips and a coil;
forming an overcoat layer over said GMR head elements;
forming a seed layer on said overcoat layer;
forming a mask layer on said seed layer, said mask layer having an opening at a location where a trench is to be formed in said overcoat layer, said opening exposing an exposed section of said seed layer;
etching said exposed section of said seed layer through said opening in said mask layer using a wet chemical;
directing an ion milling beam into said opening in said mask layer to remove remaining portions of said exposed section of said seed layer;
wherein said remaining portions are left on completion of said etching; and
etching said overcoat layer through said opening in said mask layer to create a trench in said overcoat layer.

2. The method of claim 1 wherein said opening in said mask layer is configured such that etching said overcoat layer creates a rectilinear lattice of trenches in said overcoat layer.

3. The method of claim 2 wherein said plurality of GMR head elements are separated from each other by said rectilinear lattice of trenches.

4. The method of claim 3 comprising separating said GMR head elements.

5. The method of claim 4 wherein separating said GMR head elements comprises running a dicing saw blade over a plurality of linear saw paths, each of said linear paths lying within said trenches.

6. The method of claim 5 wherein said saw blade makes no substantial contact with said overcoat layer.

7. The method of claim 1 wherein etching said overcoat layer comprises reactive ion etching.

8. The method of claim 1 wherein forming an overcoat layer comprises forming a layer comprising a material selected from the group consisting of silicon dioxide and silicon nitride.

9. The method of claim 8 wherein forming a mask layer comprises:
depositing a photoresist layer on said seed layer;
patterning said photoresist layer so as to leave sections of said photoresist layer remaining;
depositing said mask layer between said sections of said photoresist layer; and
removing said sections of said photoresist layer so as to form said opening.

10. The method of claim 9 wherein depositing said mask layer comprises plating.

11. The method of claim 9 wherein depositing said mask layer comprises physical vapor deposition.

12. The method of claim 8 wherein forming said mask layer comprises forming a NiFe layer.

13. The method of claim 12 wherein forming said seed layer comprises evaporation or physical vapor deposition.

14. The method of claim 13 wherein forming said seed layer comprises forming a layer comprising a material selected from the group consisting of Ta/Cu/NiFe, CoFe, CoFeN and NiCr.

15. The method of claim 14 wherein said wet chemical comprises a mixture of $H_2SO_4$ and ammonium sulfate.

16. The method of claim 15 wherein said directing of ion milling beam is performed for 5 to 10 minutes.

17. The method of claim 16 wherein said directing is performed with said ion beam set at an angle of from −10° to −70° with respect to normal of the surface of said overcoat layer.

18. The method of claim 8 wherein forming said mask layer comprises forming a layer comprising a material selected from the group consisting of CoFe and CoNiFe.

19. The method of claim 18 wherein forming said seed layer comprises evaporation or physical vapor deposition.

20. The method of claim 19 wherein forming said seed layer comprises forming a layer comprising NiCr.

21. The method of claim 20 wherein said directing of ion milling beam is performed for 5 to 10 minutes.

22. The method of claim 21 wherein said directing is performed with said ion beam set at an angle of from −10° to −70° with respect to normal of the surface of said overcoat layer.

23. The method of claim 8 wherein forming said mask layer comprises forming a Cu layer.

24. The method of claim 23 wherein forming said seed layer comprises evaporation or physical vapor deposition.

25. The method of claim 24 wherein forming said seed layer comprises forming a layer comprising a material selected from the group consisting of AuCr, Cu and NiFe/Cu.

26. The method of claim 25 wherein said wet chemical comprises a mixture of $NaH_4OH$ and ammonium persulfate.

27. The method of claim 26 wherein said directing of ion milling beam is performed for 5 to 10 minutes.

28. The method of claim 27 wherein said directing is performed with said ion beam set at an angle of from $-10°$ to $-70°$ with respect to normal of the surface of said overcoat layer.

* * * * *

UNITED STATES PATENT AND TRADEMARK OFFICE
CERTIFICATE OF CORRECTION

PATENT NO. : 7,520,048 B2 Page 1 of 1
APPLICATION NO. : 11/809184
DATED : April 21, 2009
INVENTOR(S) : Yunxiao Gao et al.

It is certified that error appears in the above-identified patent and that said Letters Patent is hereby corrected as shown below:

On the title page item (56) References Cited

In the second column, OTHER PUBLICATIONS, first line:

"U.S. Appl. No. 10/857,063," should be -- U.S. Appl. No. 10/857,036, --.

Signed and Sealed this

Second Day of June, 2009

JOHN DOLL
*Acting Director of the United States Patent and Trademark Office*